G. SIMON.
Trimming.
No. 8,423. Reissued Sept. 17, 1878.
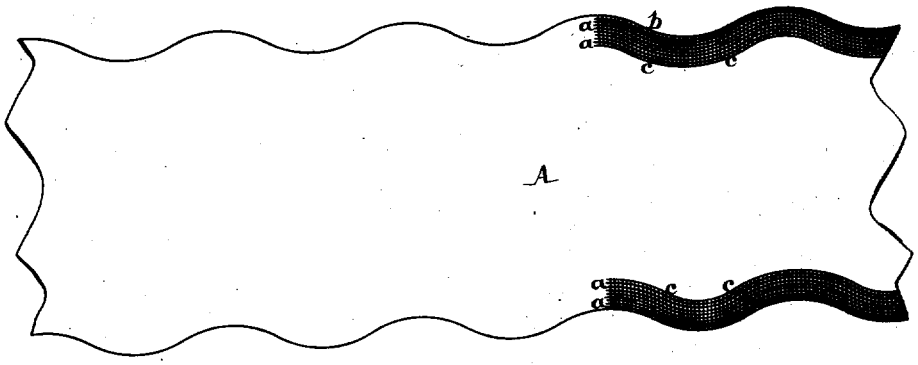
Witnesses.
Chas. Wahlers.
W. C. Hauff.
Inventor.
Gustave Simon
by his attys.
Van Santvoord & Hauff
N. PETERS, PHOTO-LITHOGRAPHER, WASHINGTON, D. C.

UNITED STATES PATENT OFFICE.

GUSTAVE SIMON, OF NEW YORK, N. Y.

IMPROVEMENT IN TRIMMINGS.

Specification forming part of Letters Patent No. 204,626, dated June 4, 1878; Reissue No. 8,423, dated September 17, 1878; application filed August 28, 1878.

*To all whom it may concern:*

Be it known that I, GUSTAVE SIMON, of the city, county, and State of New York, have invented a new and useful Improvement in Trimmings for Ladies' and Children's Wear, which improvement is fully set forth in the following specification, reference being had to the accompanying drawing, which represents a face view of my trimming.

This invention relates to a trimming with scalloped edges, which are produced by pressing the fabric in a suitable manner, whereby all the longitudinal threads are made to form wave-lines, and the edges of the fabric are brought to the required shape without the necessity of cutting.

The ordinary method of producing scalloped edges on a trimming is by cutting the edges to the required form. This operation is very tedious. It requires considerable practice, and when the trimming is finished the longitudinal threads do not run parallel to the scalloped edge or edges.

Scalloped trimmings have also been produced on looms by weaving the same in the required form; but such operation is difficult and admits of a limited use only.

There has also been produced a trimming having transverse plaits, the edges of which are scalloped, the opposite longitudinal edges of the trimming being straight, so that in each of the plaits one set of threads is serpentine and the other rectilinear.

In carrying out my invention, I take the trimming and pass the same through between plain, fluted, or corrugated rollers by means of a gage or carriage which has a reciprocating motion, causing the material to pass between the rollers in an undulating line. By this operation all the longitudinal threads, hems, stitchings, tucks, and other ornamental patterns are brought to form wave-lines parallel to each other, and the edges of the fabric become scalloped without cutting. The contours of the scallops thus produced may be perfectly regular, or they may be irregular, according to the lateral motion imparted to the fabric in its passage between the rollers, and the whole operation can be performed very rapidly.

The selvage on the edges of the trimming is not destroyed, as when it is cut, and, furthermore, a peculiar effect is imparted to the whole trimming by bringing all the longitudinal threads, together with the hems, stitchings, tucks, or ornamental patterns, into the form of wave-lines parallel to the scalloped edges.

In the accompanying drawing, the letter A designates a piece of trimming, the longitudinal threads *a* of which are made to form wave-lines, while the edges *b* are scalloped. The transverse threads *c* remain rectilinear.

This invention is applicable to trimmings of any kind in which it is desirable to produce scalloped edges.

The machine which I use in producing my trimming forms the subject-matter of an application for a separate patent, and I have not therefore given a detailed description thereof herein.

What I claim as new, and desire to secure by Letters Patent, is—

1. The process of treating trimmings made with rectilinear longitudinal and transverse threads to produce a trimming having scalloped edges, serpentine parallel longitudinal threads, and rectilinear parallel transverse threads and which consists in passing straight-edged trimming between rollers combined with a reciprocating gage or carriage, arranged to cause said trimming to travel lengthwise in an undulating line, substantially as set forth.

2. As a new article of manufacture, a trimming having scalloped edges, its longitudinal threads being arranged in serpentine form and parallel to each other, while its transverse threads are rectilinear and parallel, as set forth.

In testimony that I claim the foregoing I hereunto set my hand.

GUSTAVE SIMON.

Witnesses:

FRANK M. TAYLOR,

A. G. LANE.